United States Patent
Wagh et al.

(10) Patent No.: US 8,161,243 B1
(45) Date of Patent: Apr. 17, 2012

(54) ADDRESS TRANSLATION CACHING AND I/O CACHE PERFORMANCE IMPROVEMENT IN VIRTUALIZED ENVIRONMENTS

(75) Inventors: Mahesh Wagh, Portland, OR (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 11/906,176

(22) Filed: Sep. 28, 2007

(51) Int. Cl.
G06F 12/10 (2006.01)
G06F 12/12 (2006.01)

(52) U.S. Cl. ............... 711/133; 711/207; 711/E12.067; 711/E12.076

(58) Field of Classification Search .................. 711/133, 711/137, 205, 207, E12.014, E12.067, E12.076
See application file for complete search history.

(56) References Cited

U.S. PATENT DOCUMENTS

| | | | |
|---|---|---|---|
| 6,009,488 A | 12/1999 | Kavipurapu | |
| 6,128,703 A * | 10/2000 | Bourekas et al. | 711/138 |
| 6,772,295 B2 * | 8/2004 | Spencer et al. | 711/137 |
| 6,789,168 B2 * | 9/2004 | Jeddeloh | 711/122 |
| 6,886,085 B1 | 4/2005 | Shuf et al. | |
| 2004/0117557 A1 * | 6/2004 | Paulraj et al. | 711/137 |
| 2004/0123278 A1 * | 6/2004 | Nanja et al. | 717/153 |
| 2004/0233146 A1 * | 11/2004 | Nguyen | 345/82 |
| 2005/0149562 A1 | 7/2005 | Browne et al. | |
| 2005/0166024 A1 * | 7/2005 | Angelo et al. | 711/164 |
| 2006/0075285 A1 * | 4/2006 | Madukkarumukumana et al. | 714/5 |
| 2006/0179175 A1 * | 8/2006 | Bockhaus et al. | 710/22 |
| 2007/0005863 A1 * | 1/2007 | Chang et al. | 710/302 |
| 2007/0088915 A1 * | 4/2007 | Archambault et al. | 711/137 |
| 2007/0088919 A1 * | 4/2007 | Shen et al. | 711/154 |
| 2007/0113044 A1 * | 5/2007 | Day et al. | 711/207 |
| 2007/0143565 A1 | 6/2007 | Corrigan et al. | |
| 2007/0168643 A1 * | 7/2007 | Hummel et al. | 711/207 |
| 2007/0186046 A1 * | 8/2007 | Irish et al. | 711/133 |
| 2007/0186071 A1 * | 8/2007 | Bellows et al. | 711/167 |
| 2007/0226450 A1 * | 9/2007 | Engbersen et al. | 711/203 |
| 2008/0120487 A1 | 5/2008 | Saripalli | |

FOREIGN PATENT DOCUMENTS

| | | |
|---|---|---|
| WO | 2006041471 A2 | 4/2006 |
| WO | 2007002425 A1 | 1/2007 |
| WO | 2009045884 A2 | 4/2009 |

OTHER PUBLICATIONS

International Search Report/Written Opinion for WO Application No. PCT/US2008/077819 dated May 14, 2009, 11 pages.

Saripalli et al., U.S. Appl. No. 11/602,715, filed Nov. 21, 2006, entitled "Address translation performance in virtualized environments".

Office Action for German Patent Application No. 102008048421.0-53, mailed on Jun. 10, 2009, 3 pages of Office Action and 4 pages of English Translation.

(Continued)

*Primary Examiner* — Pierre-Michel Bataille
*Assistant Examiner* — Hal Schnee
(74) *Attorney, Agent, or Firm* — Caven & Aghevli LLC

(57) ABSTRACT

Methods and apparatus relating to improving address translation caching and/or input/output (I/O) cache performance in virtualized environments are described. In one embodiment, a hint provided by an endpoint device may be utilized to update information stored in an I/O cache. Such information may be utilized for implementation of a more efficient replacement policy in an embodiment. Other embodiments are also disclosed.

19 Claims, 4 Drawing Sheets

OTHER PUBLICATIONS

Abramson et al., "Intel® Virtualization Technology for Directed I/O", vol. 10, Issue 03, Intel® Technology Journal, Aug. 10, 2006, pp. 179-192.

"IA-32 Intel Architecture Software Developer's Manual", Intel, vol. 3, System Programming Guide, Order No. 245472, 2001, total of 5 pages, including pp. 3-26, 3-35 and 3-36.

Office Action for Chinese Patent Application No. 200810161925.9, mailed on Apr. 28, 2010, 6 pages of Office Action and 11 pages of English Translation.

International Preliminary Report on Patentability for PCT Application No. PCT/US2008/077819, mailed on Apr. 8, 2010, 6 pages.

Office Action for German Patent Application No. 102008048421.0-53, mailed on Jan. 20, 2011, 3 pages of Office Action and 2 pages of English translation.

Office Action for Chinese Patent Application No. 200810161925.9, mailed on Mar. 24, 2011, 6 pages of Office Action and 12 pages of English translation.

Office Action for Russian Patent Application No. 2010104040/80 mailed on Mar. 2, 2011, 7 pages of Office Action and 5 pages of English translation.

* cited by examiner

ADDRESS TRANSLATION CACHING AND I/O CACHE PERFORMANCE IMPROVEMENT IN VIRTUALIZED ENVIRONMENTS

BACKGROUND

The present disclosure generally relates to the field of electronics. More particularly, an embodiment of the invention relates to improving address translation caching and/or input/output (I/O) cache performance in virtualized environments.

I/O virtualization is a technology being developed to ensure that I/O devices function properly in a virtualized environment. Generally, a virtualized environment may be an environment in which more than one operating system (OS) may be active at the same time. Some implementations of I/O virtualization may utilize hardware structures to improve performance. Such implementations may however require a relatively high gate count to realize, which would in turn be more costly and/or complex to implement.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may improve address translation caching (such as virtualization for directed I/O (VTd) address translation) and/or I/O cache performance in virtualized environments. More specifically, some virtualization services may be implemented in hardware structures that are utilized to translate a guest physical address (GPA) to host physical addresses (HPA). Accordingly, such structures may provide caching support, e.g., in the form of I/O look-aside-buffers (IOTLBs) to cache the GPA to HPA translations. In some embodiments, these caching structures may provide lower latency for requests that target the same address translation. Furthermore, some of the techniques may be utilized in various types of computing environments, such as those discussed with reference to FIGS. 1-4.

Figure 1:
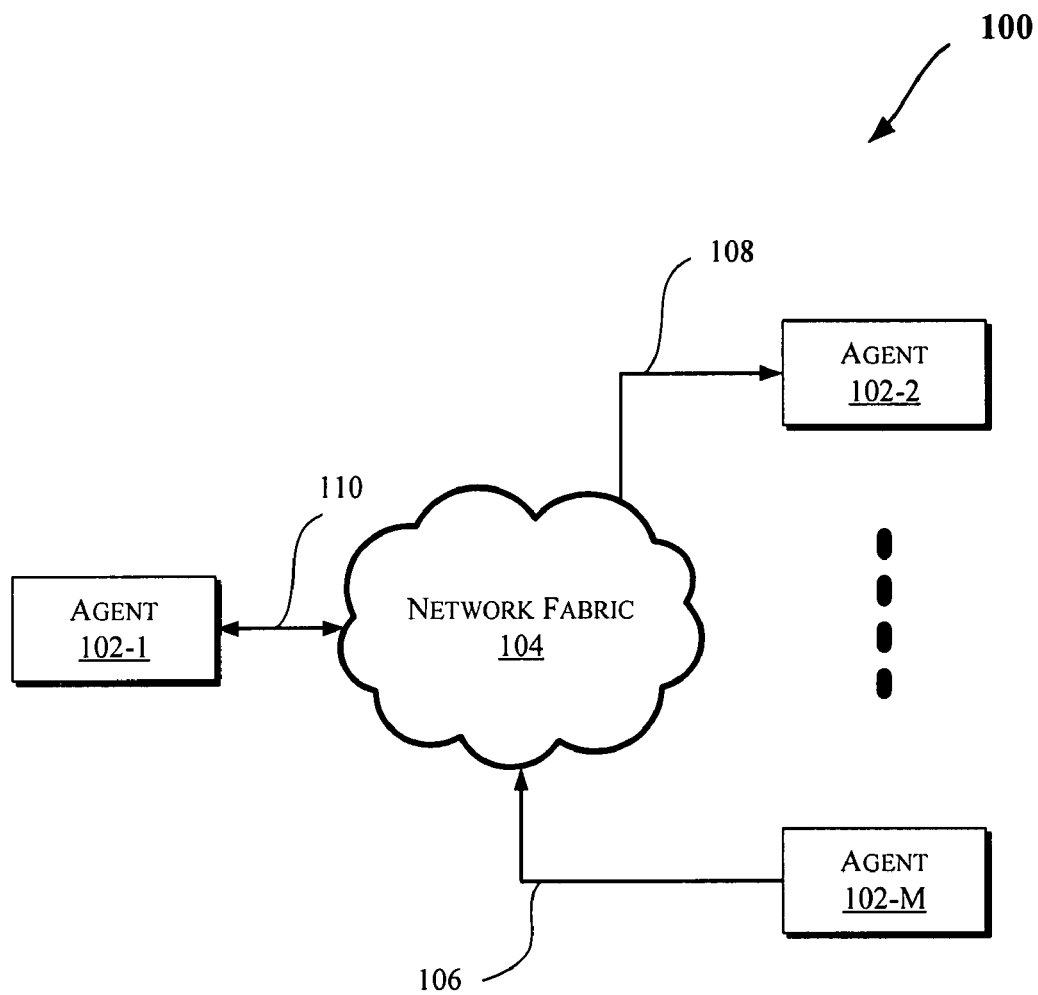
FIGS. 1-3 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2-4.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
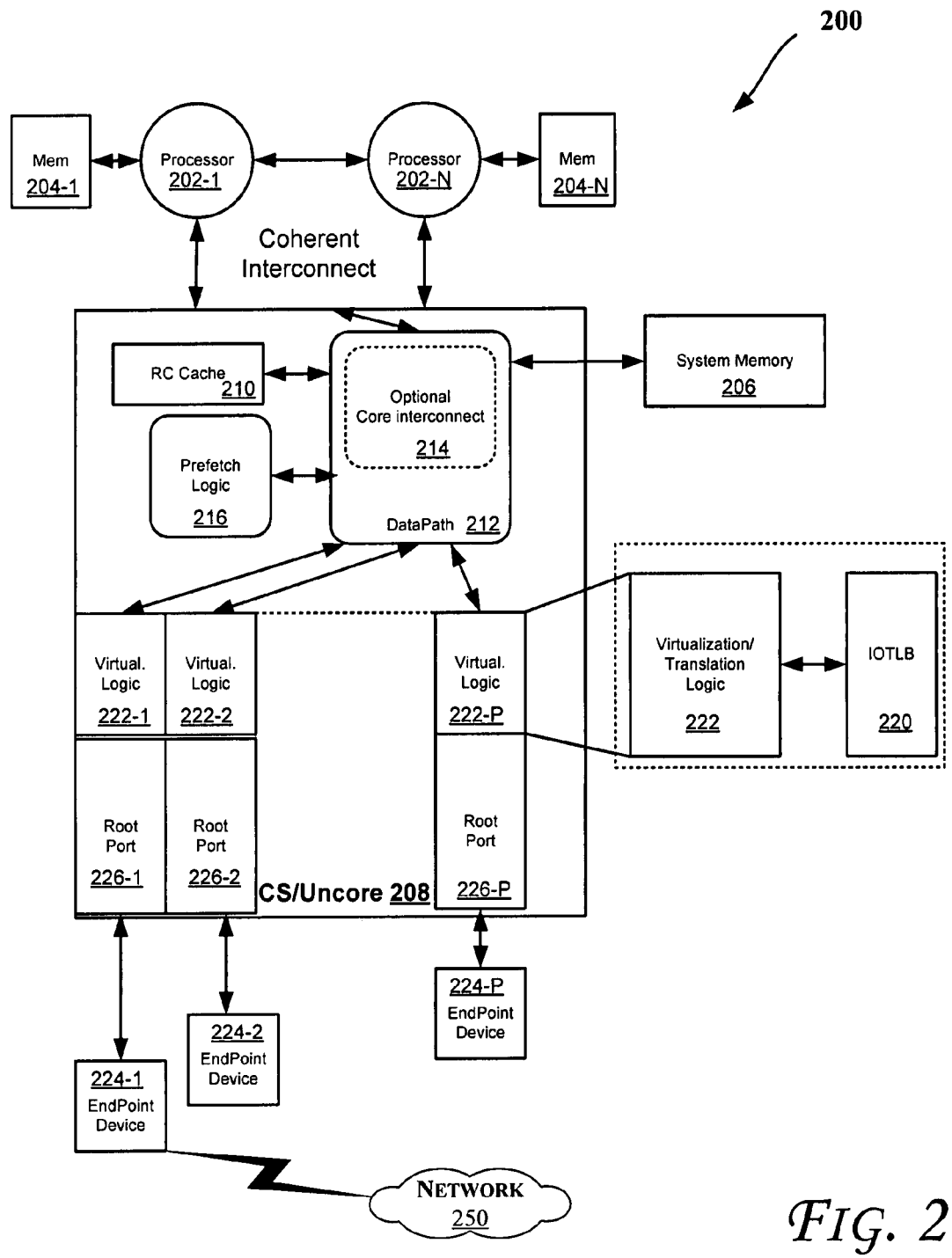

FIG. 2 illustrates a block diagram of portions of a computing system 200, according to an embodiment. In one embodiment, various components of the system 200 may be implemented within one of the agents 102-1 and/or 102-M discussed with reference to FIG. 1. Further details regarding some of the operations of the computing system 200 will be discussed herein with reference to FIG. 4.

The system 200 may include one or more processors 202-1 through 202-N (collectively referred to herein as "processors 202" or more generally "processor 202"). Each of the processors 202-1 through 202-N may include various components, such as private or shared cache(s), execution unit(s), one or more cores, etc. Moreover, each of the processors 202 may have access to a memory 204 (e.g., memories 204-1 through 204-N). Also, the system 200 may include an optional system memory 206 that may be shared by various components of the system 200, including, for example, one or more of the processors 202, components of an uncore or chipset (CS) 208, or components coupled to the uncore 208, etc. One or more of the memories 204 and/or 206 may store one or more operating systems. Hence, the system 200 may be capable of executing a plurality of operating systems (e.g., at the same time) in some embodiments.

As shown in FIG. 2, the uncore 208 may include various components such as root complex (RC) cache 210 (e.g., that may be shared amongst various components of a computing system such as the system 200). In some embodiments, the RC cache 210 may be present in a memory control hub (MCH) and/or a graphics MCH (GMCH) portion of a chipset or uncore (e.g., CS/uncore 208). The RC cache 210 may communicate with other components via a data path 212 (which may include an optional core interconnect 214, e.g., to facilitate communication between one or more cores of the processors 202 and other components of the system 200). The system 200 may further include a prefetch logic 216, e.g., to prefetch data (including instructions or micro-operations) from various locations (such as one or more of the memories 204, the system memory 206, other storage devices, including for example a volatile or non-volatile memory device, etc.) into an IOTLB 220 (e.g., via virtualization or translation logics 222-1 through 222-P (collectively referred to herein as "logics 222" or more generally "logic 222")).

As shown in FIG. 2, in at least one embodiment, the data path 212 may be coupled to one or more I/O devices. Any type of an I/O device may be utilized. For illustrative purposes, in the embodiment illustrated in FIG. 2, the I/O devices may include one or more devices 224-1 through 224-P (collectively referred to herein as "endpoint devices 224" or more generally "endpoint 224"). The endpoint devices 224 may be peripheral component interconnect (PCI) devices in an embodiment.

For example, the endpoint devices 224 may communicate with the CS/uncore 208 in accordance with the PCI Local Bus Specification, Revision 3.0, Mar. 9, 3004, available from the PCI Special Interest Group, Portland, Oreg., U.S.A. (hereinafter referred to as a "PCI bus"). Alternatively, the PCI-X Specification Rev. 3.0a, Apr. 33, 3003, hereinafter referred to as a "PCI-X bus") and/or PCI Express (PCIe) Specifications (PCIe Specification, Revision 2.0, October 2006), available from the aforesaid PCI Special Interest Group, Portland, Oreg., USA, may be utilized. Further, other peripherals coupled to the CS/uncore 208 may include, in various embodiments of the invention, integrated drive electronics (IDE) or small computer system interface (SCSI) hard drive(s), universal serial bus (USB) device(s), a keyboard, a mouse, parallel port(s), serial port(s), floppy disk drive(s), digital output support (e.g., digital video interface (DVI)), etc.

As shown in FIG. 2, the endpoint devices 224 may communicate through root ports 226-1 through 226-P (collectively referred to herein as "ports 226" or more generally "port 226") with other components of system 200 such as the logics 222. In an embodiment, the logics 222 may perform address translation operations for virtualized environments, such as translating virtual addresses into physical addresses, e.g., by reference to the IOTLB 220. The physical addresses may correspond to locations (e.g., entries) with a system memory 206. The logic 222 may additionally perform other operations such as those discussed with reference to FIGS. 3 and 4 which may involve translation of GPA and HPA of entries in a memory device coupled to the systems 200 and/or 300 (such as the system memory 206). Also, the logic 222 may be a root complex in accordance with the PCIe specification.

Moreover, the processors 202 may be any type of processor such as a general purpose processor, a network processor (which may process data communicated over a computer network 250), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors. Also, as shown in FIG. 2, at least one or more of the endpoint devices 224 may be coupled to the network 250 in an embodiment.

Further, the processors 202 may include one or more caches (not shown), which may be private and/or shared in various embodiments. Generally, a cache stores data corresponding to original data stored elsewhere or computed earlier. To reduce memory access latency, once data is stored in a cache, future use may be made by accessing a cached copy rather than refetching or re-computing the original data. The cache(s) discussed herein (including, for example, RC cache 210, IOTLB 220, combinations thereof, etc.) may be any type of cache, such a level 1 (L1) cache, a level 2 (L2) cache, a level 3 (L3), a mid-level cache, a last level cache (LLC), combinations thereof, etc. to store electronic data (e.g., including instructions) that is utilized by one or more components of the system 200.

In an embodiment, the systems 200 and/or 300 may also include other devices such as one or more of: a display device (e.g., coupled to the CS/uncore 208 to display images), an audio device (e.g., coupled to the CS/uncore 208 to process audio signals), etc. In some embodiments, such devices may be implemented as endpoint devices 224 (which may communicate with the CS/uncore 208 via root ports 226, for example).

Figure 3:
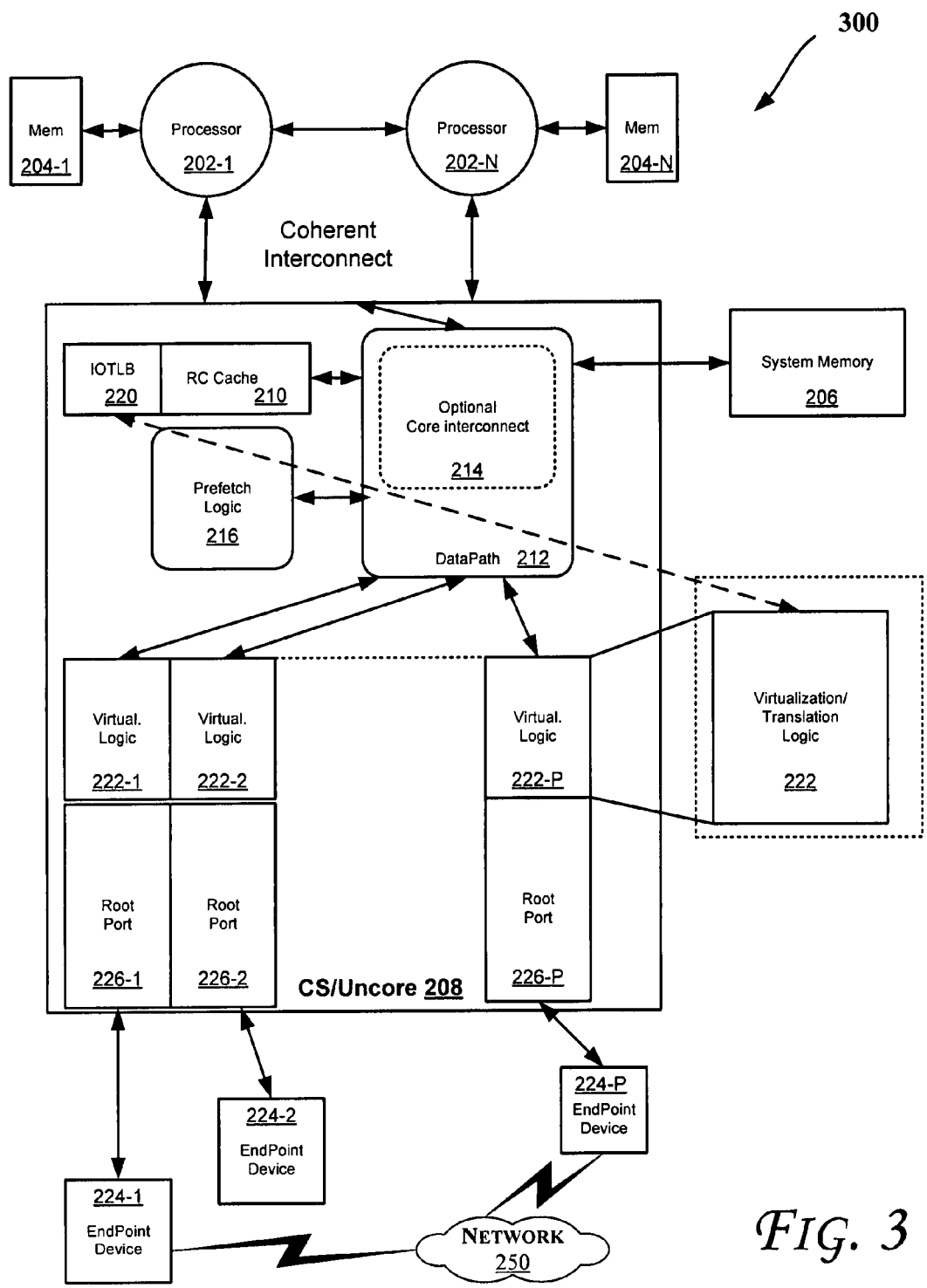

FIG. 3 illustrates a block diagram of portions of a computing system 300, according to an embodiment. In one embodiment, various components of the system 300 may be implemented within one of the agents 102-1 and/or 102-M discussed with reference to FIG. 1. Further details regarding some of the operations of the computing system 300 will be discussed herein with reference to FIG. 4.

As shown in FIG. 3, the system 300 may include one or more of the processors 202, memories 204, system memory 206, RC cache 210, data path 212, optional core interconnect 214, prefetch logic 216, IOTLB 220, logic 222, endpoints devices 224, and root ports 226. Also, as illustrated, the RC cache 210 and IOTLB 220 may be combined into a single cache in one embodiment.

Figure 4:
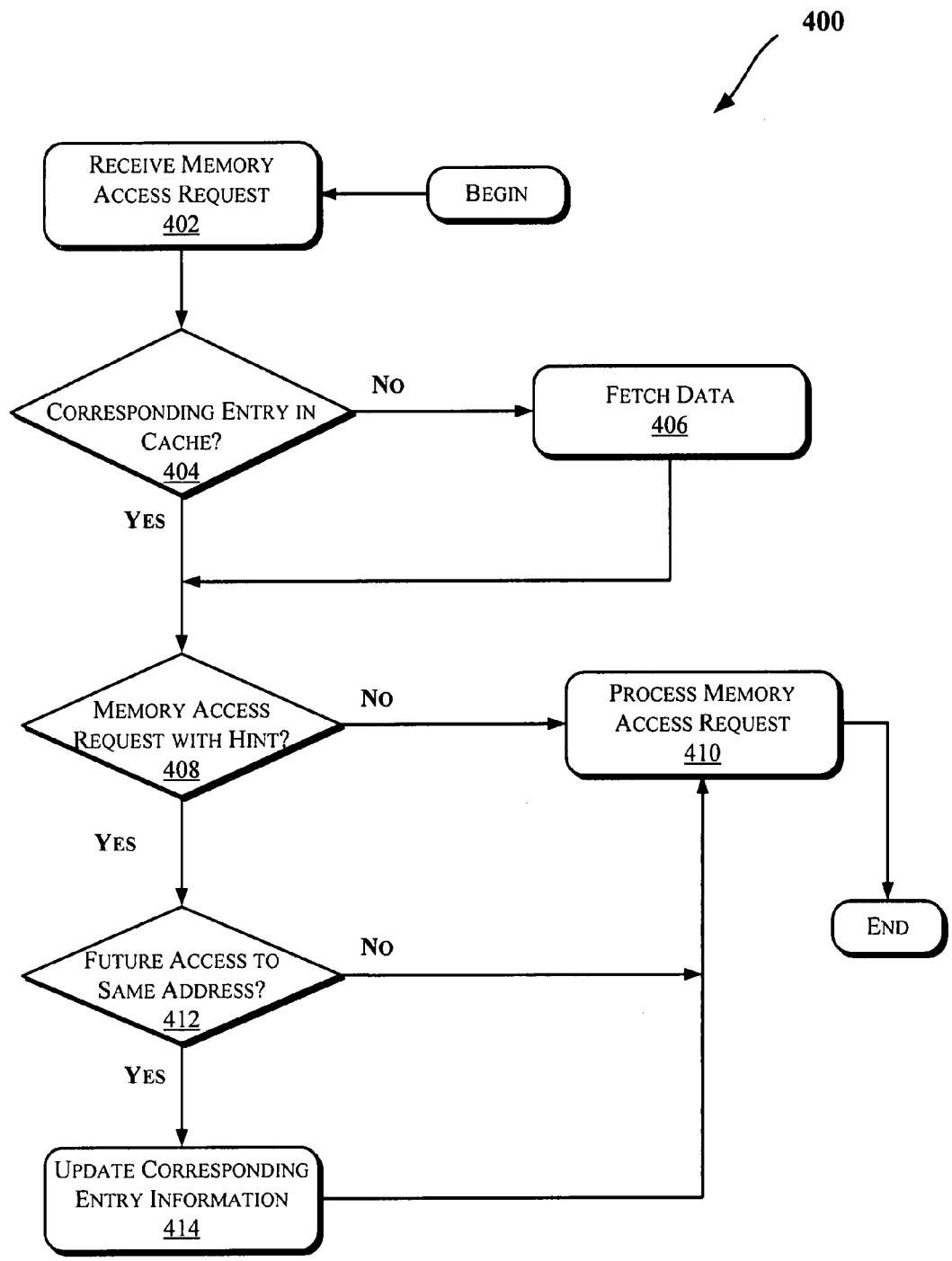
FIG. 4 illustrates a flow diagram of a method according to an embodiment.

FIG. 4 illustrates a flow diagram of a method 400 to update information stored in an I/O cache to improve address translation caching and/or I/O cache performance in virtualized environments, according to an embodiment. In one embodiment, various components discussed with reference to FIGS. 1-4 may be utilized to perform one or more of the operations discussed with reference to FIG. 4.

Referring to FIGS. 1-4, at an operation 402, the method 400 starts with receiving a memory access request. For example, a memory access request (such as a read or write access) may be generated by one of the endpoints 224 and received by a corresponding virtualization logic 222 through one of the ports 226 at operation 402. At an operation 404, it may be determined whether an entry corresponding to the memory access request exists in a cache. In an embodiment, the virtualization logic 222 may access the IOTLB 220, the RC cache 210, and/or combinations thereof (such as shown in FIG. 3) at operation 404. If a corresponding entry is absent, the data may be fetched into the cache at operation 406 (e.g., by the virtualization logic 222 and/or the prefetch logic 216).

In an embodiment, corresponding data may have been pre-fetched into cache by the logic 216 prior to operation 402. In one embodiment, the prefetch request is issued by one of the endpoint devices 224 to fetch-ahead and maintain coherent copies of the targeted address location. These prefetch requests also would enable to warm up the IOTLB 220, RC cache 210, and/or combinations thereof; the entries would be allocated and cached until the request is issued by the device. The demand request ACH settings would determine if the entry in the IOTLB 220, RC cache 210, and/or combinations thereof, needs to be maintained or tagged for replacement.

At an operation 408, it may be determined (e.g., by the virtualization logic 222) whether the memory access request includes a hint (such as one or more bits of the memory access request). If no hint exists, the memory access request may be processed at an operation 410, e.g., by translating HPA and GPA addresses and/or physical/virtual addresses by reference to entries within the IOTLB 220, RC cache 210, and/or combinations thereof. In one embodiment, address translation caching and/or I/O cache performance in virtualized environments performance may be improved based on I/O device traffic hints (which may be also referred to herein as access control hints (ACHs)). For example, ACHs may be supplied by an I/O device (e.g., one of the endpoints 224) in the memory request (e.g., over PCIe) to indicate if the device would access the same address again. Accordingly, an operation 412 may determine whether the hint indicates future access to the same address. This information may be stored in one or more bits corresponding to a cache entry (e.g., an entry within the IOTLB 220, RC cache 210, and/or combinations thereof) that would be useful in cache line replacement policies, for example, where cached translations without the intended re-use bit set (or cleared depending on the implementation) would be candidates for replacements. In one embodiment, the logic 222 may perform operation 412. If no future access is indicated, the method 400 resumes with operation 410. Otherwise, the corresponding entry information may be updated at operation 414 (e.g., one or more bits for a corresponding entry in the IOTLB 220, RC cache 210, and/or combinations thereof may be updated by the corresponding logic 222). After operation 414, the method 400 resumes at operation 410.

In some embodiments, consolidating IOTLB 220 and RC cache 210 structures into a combined IOTLB cache and RC cache structure (which may be referred to herein as an I/O cache) may provide improved performance (e.g., improve latency for I/O transactions) and/or a more effective utilization of silicon real-estate (e.g., reduce the total number of gates). In an embodiment, snoops issued by a processor (e.g., one or more of the processors 202) would look up in the RC cache 210 (or the combined I/O cache) using the physical address, the I/O accesses would look up the address in the RC cache 210 (or the combined I/O cache) based on GPA.

In some embodiments, various cache replacement policies may be applied to the RC cache 210, IOTLB 220, and/or the combinations thereof. For example, some replacement policies may implement random replacement policies, whereas others may implement least recently used (LRU) policies.

Accordingly, in some embodiments, the address translation latency and/or latency associated with servicing I/O requests may be reduced. Also, consolidation of storage (e.g., address or data) structures used for RC cache 210 and IOTLB 220 (e.g., into a single I/O cache) may yield improved silicon efficiency and better performance or silicon-area (e.g., through a reduction in gate count).

In various embodiments of the invention, the operations discussed herein, e.g., with reference to FIGS. 1-4, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

For example, a storage device as discussed herein may include volatile and/or nonvolatile memory (or storage). Nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media capable of storing electronic data (e.g., including instructions). Volatile storage (or memory) may include devices such as random access memory (RAM), dynamic RAM (DRAM), synchronous DRAM (SDRAM), static RAM (SRAM), etc.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a cache to store one or more entries, wherein each entry corresponds to an input/output (I/O) memory access request and each entry is to comprise a guest physical address (GPA), corresponding to the I/O memory access request, and a corresponding host physical address (HPA); and
a first logic to receive a first I/O memory access request from an endpoint device and to determine whether the first I/O memory access request comprises a future access hint associated with an address, wherein the future access hint is to indicate to a host whether the address may be accessed in the future and wherein entries in the cache that do not comprise a hint, corresponding to previous I/O memory access requests comprising future access hints, are to be replaced prior to entries that comprise the hint,
wherein the first logic is to cause an update to one or more bits, corresponding to the address, of both a cache entry of the cache and an entry in an I/O translation look-aside buffer (IOTLB) in response to a determination that the first I/O memory access request comprises the future access hint.

2. The apparatus of claim 1, wherein the endpoint device is to generate the memory access request.

3. The apparatus of claim 1, further comprising a prefetch logic to prefetch data into the cache in response to a request issued by the endpoint device.

4. The apparatus of claim 1, wherein the endpoint device comprises a peripheral component interconnect (PCI) express device.

5. The apparatus of claim 1, wherein one or more of the first logic, one or more processor cores, or the cache are on a same integrated circuit die.

6. The apparatus of claim 1, wherein the cache comprises one or more of a root complex cache, the I/O translation look-aside buffer (IOTLB), or combinations thereof.

7. The apparatus of claim 1, wherein the cache is a shared or private cache.

8. The apparatus of claim 1, wherein the cache comprises one or more of a level 1 (L1) cache, a level 2 (L2) cache, a level 3 (L3), a mid-level cache, a last level cache (LLC), or combinations thereof.

9. The apparatus of claim 1, further comprising a root port to couple the first logic and the endpoint device.

10. The apparatus of claim 1, wherein the cache is to combine a root complex cache and the I/O translation look-aside buffer (IOTLB).

11. The apparatus of claim 1, wherein a snoop operation issued by a processor is to be looked up in the cache based on a physical address and the I/O memory access request is to be looked up in the cache based on a guest physical address (GPA).

12. A method comprising:
receiving a first input/output (I/O) memory access request from an endpoint device;
storing one or more entries in a cache, wherein each entry corresponds to an input/output (I/O) memory access request between a guest physical address (GPA) and a host physical address (HPA); and
determining whether the first I/O memory access request comprises a future access hint associated with an address, wherein the future access hint is to indicate to a host whether the address may be accessed in the future and wherein entries in the cache that do not comprise a hint, corresponding to previous I/O memory access requests comprising future access hints, are to be replaced prior to entries that comprise the hint; and
updating one or more bits, corresponding to the address, of both a cache entry and an entry in an I/O translation look-aside buffer (IOTLB) in response to a determination that the first I/O memory access request comprises the future access hint.

13. The method of claim 12, further comprising translating addresses corresponding to the first I/O memory access.

14. The method of claim 12, wherein a snoop operation issued by a processor is to be looked up in the cache based on a physical address and the I/O memory access request is to be looked up in the cache based on a guest physical address (GPA).

15. A system comprising:
a memory to store one or more entries;
a cache to store one or more entries corresponding to the one or more entries stored in the memory, wherein each entry of the cache is to corresponds to an input/output (I/O) memory access request between a guest physical address (GPA) and a host physical address (HPA); and
a first logic to receive a first I/O memory access request from an endpoint device and to determine whether the first I/O memory access request comprises a future access hint associated with an address, wherein the future access hint is to indicate to a host whether the address may be accessed in the future and wherein entries in the cache that do not comprise a hint, corresponding to previous I/O memory access requests comprising future access hints, are to be replaced prior to entries that comprise the hint,
wherein the first logic is to cause an update to one or more bits, corresponding to the address, of both a cache entry and an entry in an I/O translation look-aside buffer (IOTLB) in response to a determination that the first I/O memory access request comprises the future access hint.

16. The system of claim 15, wherein the endpoint device is to generate the memory access request.

17. The system of claim 15, further comprising a prefetch logic to prefetch data into the cache in response to a request issued by the endpoint device.

18. The system of claim 15, wherein the endpoint device comprises a peripheral component interconnect (PCI) express device.

19. The system of claim 15, further comprising a display device coupled to an uncore that comprises the cache.

* * * * *